United States Patent Office 3,391,052
Patented July 2, 1968

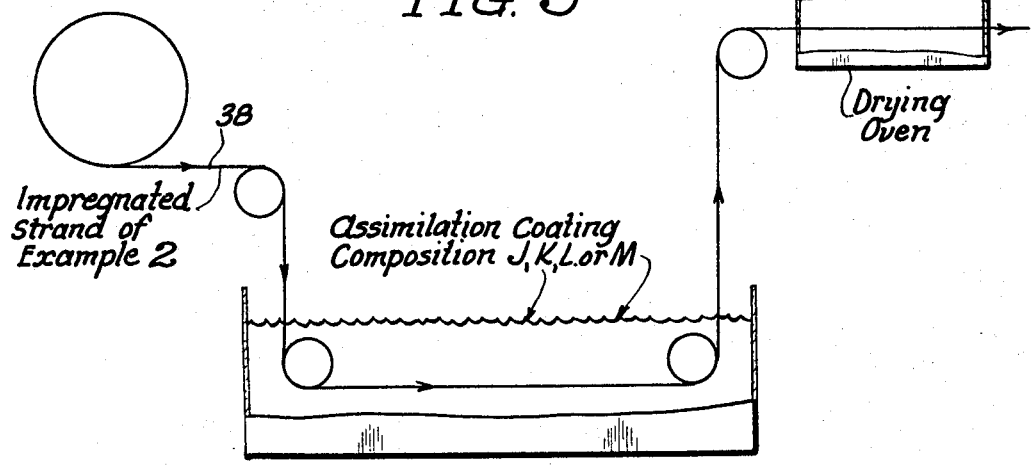
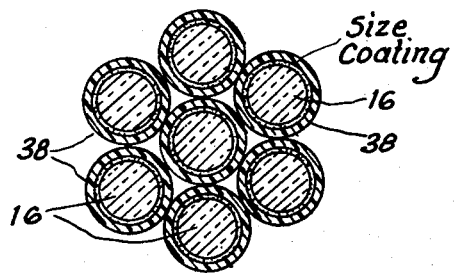
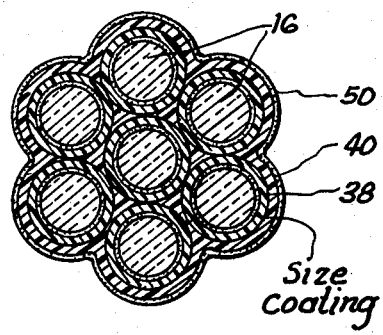
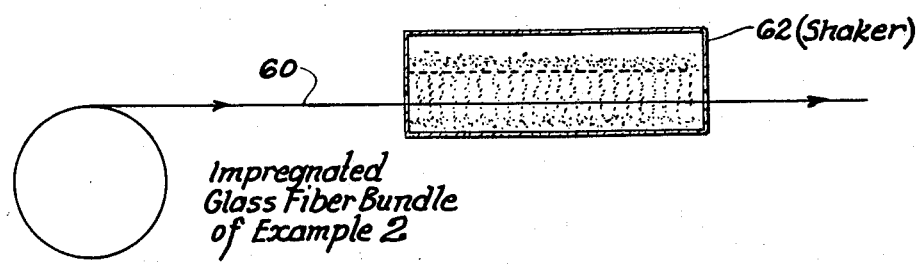

3,391,052
GLASS FIBERS TREATED FOR COMBINA-
TION WITH ELASTOMERIC MATERIALS
AND METHOD
Alfred Marzocchi, Cumberland, R.I., assignor to
Owens-Corning Fiberglas Corporation, a corpora-
tion of Delaware
Filed Oct. 26, 1964, Ser. No. 406,501
24 Claims. (Cl. 161—176)

ABSTRACT OF THE DISCLOSURE

The invention is addressed to the preparation of glass fiber bundles for combination as a reinforcement with elastomeric materials in the manufacture of glass fiber-elastomeric products wherein the glass fibers are coated and/or the bundle impregnated with an elastomeric material whereby the bundle of glass fibers becomes difficult to process in the subsequent twisting, plying and weaving steps without seizure and which includes the improvements wherein the bundle of glass fibers coated and/or impregnated with the elastomeric material is overcoated with a slip agent which enables the bundle of glass fibers to be processed through the various subsequent processing steps and wherein the slip agent constitutes the coating of glass fibers with a material such as powdered polyethylene, powdered silica, carbon black, graphite, powdered glass fibers or powdered synthetic resinous fibers, and wherein the slip agent is applied to the impregnated bundle of glass fibers with or without a previous coating of an assimilating agent in the form of an amino silane, isocyanate, phenolic end-blocked isocyanate, ethylene dimethacrylate or other poly-functional compound.

---

This invention relates to the combination of glass fibers and elastomeric materials and to glass fiber reinforced elastomeric products and elements used in the fabrication of same. It relates more particularly to glass fibers, the surfaces of which have been treated to enhance their bonding relationship between the glass fibers and elastomeric materials in the manufacture of glass fiber reinforced elastomeric products.

The invention is addressed to the fuller utilization of the desirable characteristics available from glass fibers, such as their high strength, flexibility, inertness and the like when employed in combinations with elastomeric materials, such as natural or synthetic rubbers, in the manufacture of rubber coated fibers, strands, yarns or fabrics, and rubber products in which glass fibers are embedded in the elastomeric materials such as in rubber belting, rubber hose, rubber tires and the like glass fiber reinforced elastomeric products.

It is an object of this invention to provide a means and method for improving the relationship between glass fibers strands, yarns, cords and fabrics formed thereof with elastomeric or rubber-like materials whereby fuller utilization can be made of desirable properties of the glass fibers in the glass fiber-elastomeric system.

More specifically, it is an object of this invention to provide materials and methods whereby a strong and permanent bonded relationship can be established and maintained between glass fibers and elastomeric materials employed in combinations with glass fibers in the manufactured of coated fibers, coated fabrics and rubber products whereby the glass fibers can contribute to the strength and resistance to deterioration of the elastomeric product embodying the glass fibers as an ingredient thereof, whereby separation at the interface between the glass fiber components and the continuous phase of elastomeric material is substantially avoided thereby to enhance the complete and uniform distribution of the glass fiber systems in the elastomeric materials for better utilization of the desirable properties of the glass fibers, and it is a related obect to produce and to provide a method for producing woven glass fiber fabrics which can be used in combination with elastomeric materials for the reinforcement of elastomeric products that are formed thereof.

These and other obects and advantages of this invention will hereinafter appear and for purposes of illustration, but not of limitation, an embodiment of the invention is shown in the accompanying drawing, in which:

FIG. 3 is a flow diagram illustrating a modification in the practice of this invention in the processing of glass fibers into woven fabrics intended to be used in combinations with elastomeric materials in the manufacture of glass fiber-elastomeric products;

FIG. 4 is a sectional view of glass fibers treated in accordance with the process of Example 3;

FIG. 5 is a sectional view of glass fibers treated in accordance with the process of Example 4; and FIG. 6 is a diagrammatic view illustrating a further concept of this invention.

Figure 1:
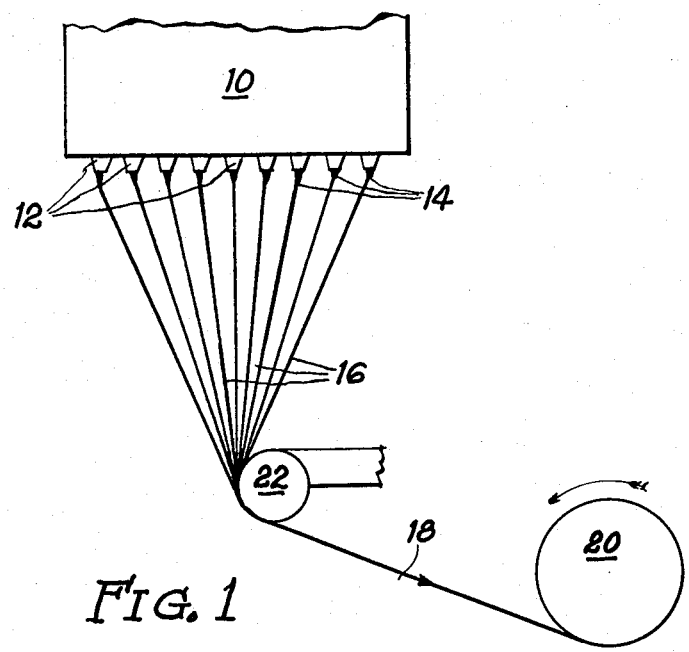
FIG. 1 is a diagrammatic view which illustrates the manufacture of continuous glass fibers and the treatment thereof in forming as a first step in the practice of this invention.

As used herein, the term "elastomer" is means to include synthetic elastomeric or rubber-like materials such as neoprene, butadiene, chloroprene, isoprene, and the like, or copolymers thereof with acrylonitrile, styrene and the like, and especially the elastomeric materials which are curable or vulcanizable by thermal reaction to a set stage with a peroxide or through sulphur linkages. The term is also intended to include natural rubbers and modifications thereof such as chlorinated rubber and the like.

While the term "glass fibers" is preferably employed to define continuous glass fibers in the form of filaments, strands, yarns, bundles, cords and fabrics formed thereof, it is also intended to include discontinuous fibers in the form of glass wool fibers and yarns and fabrics formed thereof and fibers of the continuous or discontinuous types which have been cut, chopped or otherwise reduced to shorter lengths but preferably to lengths greater than ⅛ inch. Included also are the crimped continuous or discontinuous fibers or strands, yarns and threads formed of the combination of crimped or uncrimped continuous and discontinuous fibers and fibrous bundles which have been plied or twisted in multiple groups to form yarns and cords, and fabrics formed thereof.

To the present, glass fibers which have been added or otherwise incorporated with elastomeric materials have tended to function more as a filler than as a reinforcement or as a flexibilizing or stabilizing agent, with the result that little, if any, improvements in mechanical or physical properties have been achieved by the combinations of glass fibers in products formed of such elastomeric materials. It is believed that the failure to make fuller or more effective utilization of some of the more desirable properties of the glass fibers stems from the inability properly to integrate the glass fiber systems into the elastomeric material. As a result, the glass fibers function more as a filler than as a contributing factor to the properties of the cured, vulcanized or otherwise formed elastomeric product.

Investigations have been conducted over the past many years by a number of the most skilled in the art in the effort to make fuller utilization of the glass fiber components in systems formulated of elastomeric materials with the intent of producing products having new and improved physical and mechanical properties. Substantial in-roads are now being made, as represented by the practice of this invention, which will hereinafter be described.

In the copending application, Ser. No. 218,724, filed Aug. 22, 1962, and entitled "Elastomeric-Glass Fiber Products and Process and Elements for Use in Same," now Patent No. 3,287,204, description is made of a process for the improvement in the bonding relationship between the surfaces of glass fibers and elastomeric materials by use of an anchoring agent on the glass fiber surfaces in the form of an amino silane, such as gamma-aminopropyltriethoxy silane. The amino silane, its hydrolysis product or its polymerization product, is believed preferentially to be received on the glass fiber surfaces by reason of the silicon oxide linkages of the organo silane and the silicon oxides or other groupings available on the glass fiber surfaces. Attachment between the organo silane modified glass fiber surfaces and the elastomeric materials is believed to take place through the amino nitrogen which operates through chemical or ionic forces to attract the elastomeric material to the glass fiber surfaces. The amino nitrogen is believed also to be capable of entering into the polymerization or vulcanization reaction of the elastomer to become a part thereof or otherwise to become integrated therewith whereby the organo silicon compound is able strongly to tie the elastomeric material to the glass fiber surfaces. Whatever the reason, it is known that glass fibers lose their preferential attraction for water which is replaced by a strong and relatively permanent bond with the elastomeric component whereby the glass fibers are better able to contribute their desirable properties to the glass fiber-elastomeric system.

This invention is addressed to a modification of the system described and claimed in the aforementioned copending application. In accordance with the practice of the copending application, the desired combination of glass fibers and elastomeric materials is achieved by the pretreatment of the glass fibers to produce glass fibers having plural coatings including a first coating containing an organo silicon compound, in the form of a silane, its hydrolysis product, or its polymerization product, wherein the silane has from 1 to 3 hydrolyzable groups and at least one organic group directly or indirectly attached to the silicon atom containing a nitrogen group in the form of a free amine or a group capable of being formed into a free amine; or an unsaturated group or an epoxy group; a second coating superposed on the first coating in which the second coating contains an elastomeric material, preferably the same elastomer with which the treated glass fibers are to be combined in the manufacture of the glass fiber-elastomeric product, and wherein the elastomer in the second coating is uncured or in the partially cured state although complete cure of the elastomer may be effected under certain instances which will hereinafter be defined; and a third coating in the form of an amino silane or other organo silicon compound of the type embodied in the first coating.

The plural coatings can be applied to the glass fibers while the fibers are in the form of their separate filaments produced in forming or otherwise, or the plural coatings can be applied to the glass fibers after the filaments have been gathered together and are in the form of strands, yarns, cords or fabrics, or the plural coatings can be applied to the glass fibers while in various forms such as by coating the glass fibers with the first coating as the glass fiber filaments are formed and gathered together into bundles and applying the second and third coatings to the bundles, strands, and yarns which are formed of the glass fiber filaments.

When the treated glass fibers are to be woven or otherwise processed into a glass fiber fabric for combination with the elastomeric material in the manufacture of glass fiber-elastomeric products, it has been found that the glass fiber filaments, strands or yarns having the plural coatings containing the elastomeric material exhibit such adhesions or seizures by reason of the presence of the elastomer as to interfere with the winding or weaving operations. Thus it is an important concept of this invention to modify the process wherein the treated glass fibers are to be wound, woven or otherwise processed prior to the combination with the elastomeric material.

In accordance with the described modification, the plural coated glass fibers are provided with an additional coating in the form of a carbohydrate, such as a starch. The overcoating of starch provides the characteristics of lubricity which enables the fibers to be processed through the normal winding or weaving operations into fabrics intended to be used in the combinations with elastomeric materials. The use of a starch overcoat thus enables the glass fibers to be provided with the plural coatings before being processed into the fabric thereby to maximize the improved properties that can be made available by the treatment of glass fibers in accordance with the practice of this invention.

When a starch overcoat is applied to the plural coatings on the glass fibers, it is desirable to remove the starch before the glass fiber fabric is combined with the elastomeric material in the fabrication of the elastomeric product. Such removal can be achieved by a solvent action but it is preferred to effect removal of the starch or other carbohydrate by an enzymatic reaction in which the formed glass fibers or fabric are run through an aqueous bath containing an enzyme that will decompose the starch. In practice, most of the starch will previously have been removed by reason of wear and abrasion during the winding and weaving operations. When a starch or carbohydrate overcoat is employed, the third coating of the amino silane or other organo silicon compound is preferred but not essential.

Having broadly described the concepts of this invention, illustration will be made of the practice thereof by way of the following examples which are given by way of illustration, but not by way of limitation:

EXAMPLE 1

Preparation of treated glass fibers:

In FIG. 1 of the drawing, schematic illustration is made of a means for the production of endless lengths of glass fibers including a glass melting furnace 10 having a bushing 12 on the bottom side thereof provided with a plurality of openings. The streams 14 of molten glass, flowing gravitationally from the openings in the bushing at the bottom side of the furnace, are rapidly attenuated into fine filaments 16 by winding the filaments, after they have been gathered together to form a strand 18, about a rapidly rotating winding drum 20.

The separate filaments are coated as they are gathered together into a single bundle or strand. For this purpose, use is made of an applicator 22 which may be in the form of a wiping pad wet with the fluid treating composition embodying one of the features of this invention and over which the glass fiber filaments, in forming, are passed as they are gathered together to form the strand 18 that is wound about the winding drum 20.

The composition applied to the glass fibers in forming is formulated to contain gamma-aminopropyltriethoxy silane as a component thereof. The gamma-aminopropyltriethoxy silane may be applied alone in solution in a suitable volatilizable carrier, as illustrated by compositions A and B, but it is preferred to embody the anchoring agent as an essential component in a conventional size composition and preferably in a size composition represented by the formulation of compositions C and D. When employed in a treating composition formulated to contain the gamma-aminopropyltriethoxy silane alone, as in compositions A or B, or in combination with a suitable film forming material and lubricant, as in compositions C and D, it is desirable to make use of a composition containing the anchoring agent in an amount within the range of 0.1 to 5.0 percent by weight and preferably in an amount within the range of 0.5 to 2.0 percent by weight. The following compositions are given by way of illustration of treating compositions which may be employed in this phase of the practice of this invention.

Composition A

| | Percent by weight |
|---|---|
| Gamma-aminopropyltriethoxy silane | 0.1–5.0 |

Remainder water.

Composition B

| | |
|---|---|
| Gamma-aminopropyltriethoxy silane | 0.5–2.0 |
| Glycerine | 0.3–0.6 |

Remainder water.

Composition C

| | |
|---|---|
| Partially dextrinized starch | 8.0 |
| Hydrogenated vegetable oil | 1.8 |
| Cationic wetting agent (lauryl amine acetate) | 0.4 |
| Non-ionic emulsifying agent | 0.2 |
| Gamma-aminopropyltriethoxy silane | 1.0 |

Composition D

| | |
|---|---|
| Polyester resin | 3.2 |
| Nopcogen 16 L | 0.1 |
| Triton X–100 | 0.1 |
| Polyvinyl alcohol | 0.1 |
| Polyvinyl pyrrolidone | 3.0 |
| Gamma-aminopropyltriethoxy silane | 0.3 |
| Acetic acid | 0.1 |
| Water | 93.1 |

In the foregoing examples of glass fiber treating compositions A to D, the gamma-aminopropyltriethoxy silane can be replaced, in whole or in part, with an equivalent amount of gamma-aminopropylvinyldiethoxy silane,
gamma(triethoxysilylpropylamide)propylamine,
N(gamma-triethoxysilylpropyl)propylamine,
gamma(triethoxysilylpropyloxy)propylamine,
beta-aminoallyltriethoxy silane,
para-aminophenyltriethoxy silane, aniline silane derivatives, and other amino silane compounds or organo silicon compounds formed of a silane having at least one but not more than three hydrolyzable groups and having an organic group attached directly or through an oxygen group to the silicon atom containing less than 8 carbon atoms and also containing a free amine group. While such other amino silanes or unsaturated amino silanes can be used, the results secured from the formulations containing gamma - aminopropyltriethoxy silane would indicate that the latter is in a class of its own from the standpoint of the improvements that are secured from the combinations of the treated glass fibers with elastomeric materials, although substantial improvements are secured by the use of such other anchoring agents in the compositions described.

EXAMPLE 2

Coating No. 2—the elastomeric coating:

The glass fibers sized with the first coating, in accordance with the compositions of Example 1, and gathered together and processed into strands, yarns or threads, are then impregnated to provide a second cushioning coating 38 on the size glass fiber surfaces, an essential component of the impregnating composition comprising an elastomeric material, as illustrated by the following compositions:

Composition E

| | Parts by weight |
|---|---|
| Neoprene rubber | 100 |
| Powdered magnesium oxide | 4 |
| Zinc oxide | 5 |
| Carbon black | 15 |
| Toluene | 700 |

Composition F

| | Parts by weight |
|---|---|
| Nautral rubber latex-resorcinol formaldehyde resin dispersed in aqueous medium to a solids of 38% by weight (Lotol 5440, U.S. Rubber Company, Naugatuck Chemical Division) | 40–80 |
| Percent by weight of water | 60–20 |

Composition G

| | Parts by weight |
|---|---|
| Resorcinol formaldehyde resin | 2.0 |
| Formaldehyde (37% solution) | 1.0 |
| Concentrated ammonium hydroxide | 2.7 |
| Vinyl Pyridine terpolymer latex (42% solids) | 25.0 |
| Neoprene rubber latex (50% solids) | 41.0 |
| Butadiene latex (60% solids) | 5.0 |
| Sodium hydroxide | .05 |
| Gamma-aminopropyltriethoxy silane | 1.0 |
| Water | 1100 |

Figure 2:
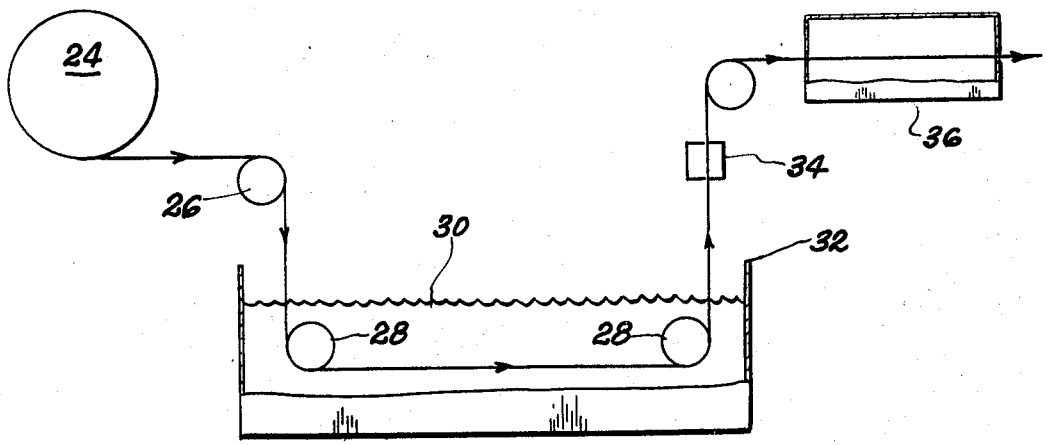
FIG. 2 is a flow diagram illustrating the practice of this invention in the preparation of glass fibers for use in combinations with elastomeric materials.

Referring now to FIG. 2 of the drawing, the treated glass fibers, in the form of strands or yarns, are unwound from a spool 24 and advanced continuously over rollers 26 and 28 into a bath 30 containing one of the treating compositions E to G housed within a container 32. From the container, the impreganted bundles of glass fibers are passed upwardly through a wiper or die 34 in which excess impregnating composition is removed from the glass fiber bundle and wherein the impregnating composition can be worked more completely into the glass fiber bundle to coat the surfaces of the glass fibers.

The bundle of glass fibers, impreganted with the composition, is advanced continuously from the wiper 34 through a drying oven 36 maintained at an elevated temperature, such as at a temperature within the range of 250° to 400° F. to remove the diluent from the impregnating composition and to advance the cure or vulcanization of the elastomeric materials in the coating preferably to a stage less than the fully cured or vulcanized condition but which may be carried to the fully cured or vulcanized state to leave an elastomeric coating 38 on the sized glass fiber surfaces.

It is desirable, in the process of Example 2, to achieve as complete impregnation of the glass fiber bundle as is possible. Under such circumstances, the great amount of surface area existing between the individual glass fiber filaments and the second coating of the elastomeric material will contribute frictional resistance to relative movements in such large proportions as to militate against slippage between the coating of the elastomeric material and the glass fibers. This additional resistance to relative movement operates in addition to the improved bonding relationship that is established between the elastomeric cating and the glass fiber surfaces by reason of the presence of an anchoring agent in the coating previously applied to the surfaces of the glass fibers. Thus the fibers in the glass fiber bundle will be in the position markedly to influence the physical and mechanical properties of the elastomeric system and to provide exceptionally good reinforcement in the elastomeric product. The frictional relationship described is still further assisted by the twist and/or the plies subsequently introduced into the glass fiber system thereby to militate against slippage of the fibers within the described elastomeric sheath.

Impregnation of coating with the elastomeric treating composition can be enhanced by the technique of flexing or bending the bundles of glass fibers while in the bath 30 of the treating composition or while wet with the treating composition, as by running the glass fiber bundle over bars or other sharp flexing or bending means. Instead, or in combination therewith, fuller impregnation can be achieved by the use of pressure dies or by advancement of the glass fiber bundle through dies which provide for pulsations between high and low pressures to work the impregnating composition into the glass fiber bundle while withdrawing entrapped gases, or by passage of the glass fiber bundle, wet with the composition, through a series of dies for alternately constricting and flexing the bundle to open the bundle, or by the technique of ultra-sonic vibration during impregnation.

EXAMPLE 3

Coating No. 3—assimilation coating:

The glass fibers coated with the cured or partially cured elastomeric material are provided with a third coating in the form of an assimilation or anchor coating formulated in accordance with the compositions A and B in Example 1, or others of the amino silanes identified in Example 1. It is preferred to apply the amino silane alone in solution or aqueous dispersion but application can be made of such amino silane admixed with other materials if desired.

Instead of making use of an amino silane as the integrating coating on the elastomeric coated glass fiber surfaces, use can be made of an epoxy silane or a Werner complex compound in which the carboxylato group coordinated with the trivalent nuclear chromium atom contains an amino group or an epoxy group such as amino propylato chromic chloride, glycine chromic chloride, β-alanine chromic complex, or glycylato chromic chloride. The foregoing materials may be substituted in equivalent amounts for the amino silane in compositions A and B. Still further, the amino silane or Werner complex compound containing an amino or epoxy group can be substituted in whole in part with other anchoring or assimilating agents such as an isocyanate, a phenolic end blocked isocyanate or a difunctional compound such as ethylene dimethacrylate or other polyfunctional compound. Treating compositions for application of the third coat onto the elastomeric coated glass fibers may be represented by the following:

Composition H

| | Percent by weight |
|---|---|
| Gamma-aminopropyl-triethoxy silane | 0.1–5.0 |
| Remainder water. | |

Composition I

| | |
|---|---|
| Carboxylato chromic chloride | 0.1–5.0 |
| Remainder water. | |

Composition J

| | |
|---|---|
| Ethylene dimethacrylate | 1–5.0 |
| Remainder solvent. | |

Composition K

| | |
|---|---|
| Isocyanate | 1–5.0 |
| Remainder water. | |

Application is made by a dip coat process on the fibrous structure previously impregnated with the elastomer in a cured and preferably uncured or partially cured state. The coated fibrous structure is air dried or dried at elevated temperature up to a temperature of 300° F. to drive off the diluent. This leaves a thin coating 40 of the amino silane or others of the anchoring agents previously described on the outer surfaces of the impregnated fibrous structure.

The described third coat or anchoring coat is preferentially employed in the system wherein the impregnating composition of Example 2 is formulated to contain neoprene as the elastomeric material, such as in Composition E. When others of the impregnating compositions are employed embodying elastomeric materials other than neoprene, the anchor coat can be employed but it is not essential since such other impregnating compositions will appear, in the absence of neoprene, to achieve full integration with the continuous phase of elastomeric material with which the glass fiber structure treated in accordance with the practice of this invention is subsequently to be combined in the manufacture of glass fiber reinforced or modified elastomeric products.

As previously pointed out, the glass fiber bundles impregnated in the manner described with an elastomeric material are subject to seizures when subsequently processed in winding, twisting, plying or weaving operations for use as a reinforcement in rubber tires, rubber belts, rubber coated fabrics or other glass fiber reinforced elastomeric products.

Description will hereinafter be made of a number of concepts which may be employed to overcome the problem of seizure so as to enable the elastomeric impregnated or treated glass fibers and glass fiber bundles to be processed into yarns, cords, fabrics and the like or to be processed through winding operations for subsequent combinations with elastomeric materials intended to be employed as the continuous phase in the composite glass fiber—elastomeric product.

In one method, previously described, the impregnated glass fiber bundle is treated to deposit a coating 50 of a starch on the surfaces of the impregnated glass fiber bundle. The starched fibrous system can thereafter be further processed by winding, twisting and/or plying into cords, yarns and threads or woven or otherwise processed into woven or non-woven fabrics.

The starch can be applied from aqueous solution, with or without other modifying agents, as represented by the following example:

EXAMPLE 4

5 percent by weight dextrinized starch; 95 percent by weight water.

The impregnated glass fiber bundle of Examples 2 or 3 is wet with the starch solution, as by a flow coating process, dip coating process and the like followed by air drying.

After the starch coated fibrous bundle has been processed to the form desired for use in combination with the elastomeric material intended to form the continuous phase, it is desirable to effect removal of such amounts of starch as might remain as a coating on the formed fibrous structure since starch does not enter easily into the cure or vulcanization reactions of the elastomer and the starch tends to interfere with the desired integration between the glass fiber system, with or without the third anchor coat, and the elastomer forming the continuous phase during subsequent cure or vulcanization to the final product.

Some portions of the starch coating 40 will usually be removed during the described processing steps of winding, twisting, plying or weaving. That which remains can easily be removed by a water rinse or by a water wash followed by drying. In the event that the removal by water leaves some of the material from the anchor coat or from the impregnating composition, starch removal can be effected by enzymatic reaction in accordance with well known procedures.

Various others of the starches or carbohydrates can be used instead of dextrinized starch, such as corn starch, potato starch, sugars, and the like.

Instead of starch, a lubricated surface can be achieved to enable the processing of the elastomeric impregnated glass fiber bundles by treatment of the glass fiber bundles with powdered polyethylene. Application can be made of the powdered polyethylene from aqueous emulsion or suspension or the powdered polyethylene can be applied dry by dusting the surfaces of the impregnated glass fiber bundles with the powdered polyethylene as illustrated by the following example:

EXAMPLE 5

Polyethylene in dry powder form is sprinkled onto the bundles of glass fibers impregnated with the elastomeric system as the glass fiber bundles 60 are advanced beneath a shaker 62 containing the powdered polyethylene. For this purpose, use can be made of polyethylene reduced to a grain size of less than 300 mesh.

EXAMPLE 6

More complete coverage and partial penetration into the glass fiber bundle can be achieved when the polyethylene is embodied as finely divided powdered particles in an aqueous suspension and the glass fiber bundles are advanced therethrough followed by drying at a temperature sufficient to drive off the diluent but insufficient to cause fusion of the polyethylene particles. An emulsion containing the polyethylene powder of 300 mesh size or less in an amount within the range of 3 to 20 percent by weight solids is satisfactory.

The polyethylene can be allowed to remain on the surfaces of the fiber bundles during subsequent combination of the treated glass fibers with the elastomeric material but it is preferred to effect removal after the treated glass fibers have been wound, twisted or plied into threads or cords or woven into fabrics and prior to combination with the elastomeric material forming the continuous phase because the polyethylene is believed to be incapable of entering into the reaction for cure or vulcanization of the rubber. Removal of the polyethylene can be effected by solvent solution with a suitable solvent system in which the polyethylene is soluble.

In somewhat the same fashion, the glass fiber bundles impregnated with the elastomeric material can be treated prior to processing into cords, yarns or fabrics by glass fibers or synthetic resinous fibers which have been milled to reduce the fibers to a powdered state. In such condition, the powdered fibers can be applied to the impregnated glass fiber bundles in somewhat the same fashion as the polyethylene powders in Examples 5 and 6. The powdered glass or synthetic resinous fibers are effective on the surfaces of the impregnated glass fiber bundles to militate against seizure during rubbing of the impregnated glass fiber bundles to enable the fiber system to be processed by winding, twisting, plying or weaving into cords or fabrics or to be processed through various winding operations for arrangement of the glass fiber system into the position desired for reinforcement.

As in the polyethylene system, it is desirable to remove as much of the powdered fibers as possible before combination of the glass fibers with the elastomeric materials of the continuous phase. This can be accomplished by wiping the fibers or by a water wash.

The concepts hereinafter to be described combine the features of lubrication of the surfaces of the glass fiber bundles impregnated with the elastomeric material to enable processing in subsequent winding, plying, twisting and weaving operations but, in the systems hereinafter described, the components applied to lubricate or to prevent seizure can be allowed to remain on the glass fiber surfaces as a component capable of entering into the cure or vulcanization reactions of the elastomer with which the processed glass fibers are subsequently to be combined in the manufacture of glass fiber reinforced elastomeric products.

For this purpose, the impregnated glass fiber bundles are treated with silica dust in finely divided form of less than 300 mesh. Application of the silica dust can be achieved in somewhat the same manner as the treatment to lubricate the impregnated glass fiber bundles with polyethylene powder by substitution of the silica dust for the polyethylene in Examples 5 and 6.

The silica dust provides the desired slip to militate against seizure during processing of the impregnated fibrous system in the normal winding, twisting, plying and weaving operations. The silica which remains on the surfaces of the glass fibers after the glass fiber bundles have been processed through the winding, twisting, plying or weaving operations enters into the glass fiber-elastomeric system as a conventional filler thereby to enhance integration of the impregnated glass fiber system and the elastomeric material.

A somewhat similar function can be achieved by the use of graphite or carbon black in the treatment of the glass fiber system impregnated with the elastomeric material of Example 2. The carbon black, on the surfaces of the impregnated glass fiber bundle, militates against seizure during processing and the carbon black can remain as a component in the cured or vulcanized rubber with which the glass fibers are combined in the manufacture of the glass fiber-elastomeric product. Carbon black can be applied in the same way as the polyethylene powder by substitution for the polyethylene in Examples 5 and 6. It can be sprayed dry onto the fibers to cling to the impregnated fibers as a lubricating coating.

As a further concept of this invention, the sizing in Example 1 and the impregnation of the bundle of sized glass fibers in Example 2 can be combined in a single coating as by modification of the composition represented by Example 3 to include an anchoring agent. The foregoing concept to combine the first and second coatings into a single coating composition which may be applied to the glass fibers in forming to load the fibers with the anchoring agent and the protective coating, while at the same time incorporating the desired amount of elastomeric material about the glass fiber surfaces, may be illustrated by the following compositions:

Composition L

| | Parts by weight |
|---|---|
| Neoprene rubber | 100 |
| Powdered magnesium oxide | 4 |
| Powdered zinc oxide | 5 |
| Carbon black | 15 |
| Gamma-aminopropyltriethoxy silane | 2 |
| Toluene | 1400 |

Composition M

| | |
|---|---|
| Natural rubber latex-resorcinol formaldehyde resin dispersed in an aqueous medium to a solids content of 38% (Lotol 4150) | 10–40 |
| Gamma-aminopropyltriethoxy silane (anchoring agent) | 0.1–5.0 |
| Water | 89.9–55 |

Composition N

| | |
|---|---|
| Natural rubber latex-resorcinol formaldehyde resin dispersed in aqueous medium to 38% solids | 15 |
| Water | 82 |
| Gamma-aminopropyltriethoxy silane | 3 |

Composition O

| | |
|---|---|
| Resorcinol formaldehyde resin | 2–10 |
| Formaldehyde (37% solution) | 1–3 |
| Concentrated ammonium hydroxide | 2–5 |
| Vinylpyridine terpolymer latex (42% solids) | 15–50 |
| Neoprene rubber latex (50% solids) | 25–50 |
| Butadiene latex (60% solids) | 5–15 |
| Alkali metal hydroxide | 0.5–0.2 |
| Anchoring agent | 0.1–3.0 |

The foregoing compositions may be applied to the glass fibers in forming in amounts to provide dry coating weights on the glass fiber surfaces within the range of 20 to 45 percent by weight and in which the treating composition is formulated to have a solids within the range of 10 to 50 percent by weight. Application can be made as described in Example 1 to produce a bundle of glass fibers in which each of the fibers are individually coated with the solids of the foregoing compositions after which the treated glass fibers can be advanced through a baking oven to cure or partially cure the elastomeric material, as described in Example 2.

The anchoring or assimilation coating of Example 3 may be applied to the bundle of glass fibers treated by the single step in coating after which the anti-seizure agents of Examples 4 to 6 may be applied to permit processing of the treated glass fibers by winding, plying, twisting or weaving to the form desired for use in combination with elastomeric materials in the manufacture of glass fiber-elastomeric products.

As previously described, the treatment of the glass fiber bundles to provide the overcoating of the anchoring or assimilating agent may be dispensed with in the systems wherein the composition which combines Examples 1 and 2 is formulated of an elastomeric material other than neoprene.

It will appear from the foregoing that I have provided a system wherein use can be made of glass fibers as a reinforcement or modifying agent for elastomeric materials wherein interfacial separation between the coatings on the glass fiber systems and the elastomeric materials with which the glass fibers are combined can be substantially eliminated through the use of an elastomeric material in the glass fiber structure, with or without an anchoring or assimilating agent, to enhance the integration of the glass fiber component impregnating the glass fiber structure and the glass fiber elastomeric system forming the continuous phase and with which the glass fibers are combined in the fabrication of glass fiber—elastomeric products.

It will be understood that changes may be made in the details of construction and formulation without departing from the spirit of the invention, especially as defined in the following claims.

I claim:

1. In the processing of glass fibers in the form of endless bundles of glass fibers for use in combination with elastomeric materials in the manufacture of glass fiber-elastomeric products wherein the elastomeric material forms the matrix in which the glass fibers are embodied and wherein the glass fibers in the bundle are formed with a coating containing an elastomer on the surfaces thereof which interferes with the processing of the bundle of glass fibers in the operations of winding, twisting, plying and weaving to process the glass fibers to the form desired for combinations with the elastomeric matrix forming material, the improvement which comprises coating the bundle of glass fibers with a lubricating material to permit processing of the elastomeric coated glass fibers in which the lubricating material is selected from the group consisting of powered polyethylene, finely divided silica, carbon black, graphite, finely divided glass fibers and finely divided synthetic resonous fibers and then processing the coated bundle of glass fibers by at least one of the processes of winding, twisting, plying and weaving to the form desired for use in combination with the elastomeric matrix forming material, and then combining the processed glass fibers with the elastomeric matrix forming material.

2. The method as claimed in claim 1 in which the coating applied to the bundle of glass fibers comprises powdered polyethylene.

3. The method as claimed in claim 1 in which the coaitng applied to the bundle of glass fibers comprises finely divided silica particles.

4. The method as claimed in claim 1 in which the coating applied to the bundle of glass fibers is formed of a carbonaceous material selected from the group consisting of carbon black and graphite.

5. The method as claimed in claim 1 in which the coating applied to the bundle of glass fibers comprises fibers selected from the group consisting of glass and synthetic resinous fibers reduced to a finely divided state.

6. In the processing of glass fibers in the form of endless bundles of glass for use in combinations with elastomeric materials in the manufacture of glass fiber-elastomeric products wherein the elastomeric material constitutes the matrix, the steps of impregnating the bundles of glass fibers with a composition containing an elastomeric material as an essential ingredient, overcoating the impregnated bundle of glass fibers with a lubricating and slip agent to prevent seizure of the glass fiber bundle when processing to the form desired for combination with the elastomeric matrix forming material by at least one of the processes of winding, twisting, plying and weaving in which the lubricating material is selected from the group consisting of powdered polyethylene, finely divided silica, carbon black, graphite, finely divided glass fibers, and finely divided synthetic resinous fibers, processing the coated bundle of glass fibers to the form for combination with the elastomeric matrix forming material and then combining the processed glass fibers with the elastomeric matrix forming material.

7. The method as claimed in claim 6 in which the material overcoating the impregnated bundle of glass fibers comprises powdered polyethylene.

8. The method as claimed in claim 6 in which the material overcoating the impregnated bundle of glass fibers is a siliceous material selected from the group consisting of finely divided silica and milled glass fibers.

9. The method as claimed in claim 6 in which the overcoating on the impregnated bundle of glass fibers comprises a carbonaceous material selected from the group consisting of carbon black and graphite.

10. In the processing of glass fibers in the form of endless bundles of glass fibers for use in combination with elastomeric materials in the manufacture of glass fiber-elastomeric products wherein the elastomer material constitutes the matrix, the steps of impregnating the bundle of glass fibers with a composition containing an elastomeric material as an essential ingredient, coating the impregnated bundle of glass fibers with an assimilation material for blending the elastomeric material of the impregnant with the elastomeric matrix forming material, overcoating the assimilation coating with a lubricating and slip material to prevent seizure of the glass fiber bundle when processed to the form desired for combination with the elastomeric matrix forming material by at least one of the processing steps of winding, twisting, plying and weaving, processing the coated bundle of glass fibers to a form desired for combination with the elastomeric matrix forming material and combining the processed glass fibers with the elastomeric matrix forming material.

11. The method as claimed in claim 10 in which the assimilaiton coating comprises a compound selected from the group consisting of an organo silicon compound and a Werner complex compound in which the organic group attached to the silicon atom of the organo silicon compound and the carboxylato group attached to the chromium atom of the Werner complex compound contains a group selected from the group consisting of an amino group and an epoxy group.

12. The method as claimed in claim 10 in which the overcoating is formed of a carbohydrate and which includes the step of removing the carbohydrate from the glass fiber bundle before combining with the elastomeric matrix forming material.

13. The method as claimed in claim 10 in which the overcoating comprises powdered polyethylene.

14. The method as claimed in claim 10 in which the overcoating is a siliceous material selected from the group consisting of finely divided silica and milled glass fibers.

15. The method as claimed in claim 10 in which the overcoating comprises a carbonaceous material selected from the group consisting of carbon black and graphite.

16. The method as claimed in claim 10 in which the assimilation coating comprises a compound selected from the group consisting of an isocyanate, a phenolic end blocked isocyanate, ethylene dimethacrylate, and a polyfunctional compound.

17. In the processing of glass fibers for use in combination with elastomeric materials in the manufacture of glass fiber-elastomeric products wherein the elastomeric material comprises the matrix in which the glass fibers are distributed, the steps of coating the glass fibers with a first size composition containing an anchoring agent for anchoring elastomeric materials to the glass fiber surfaces, forming the sized glass fibers into endless bundles, impregnating the bundle of sized glass fibers with a composition containing an elastomeric material as an essential ingredient, overcoating the impregnated bundle of glass fibers with a lubricating and slip material to prevent seizure of the glass fiber bundle during processing to a form desired for combination with the elastomeric matrix forming material in which the lubricating material is selected from the group consisting of powdered polyethylene, finely divided silica, carbon black, graphite, finely divided glass fibers, and finely divided synthetic resinous fibers, processing the coated bundle of glass fibers to a form for combination with the elastomeric matrix forming material, and combining the processed glass fiber bundles with the elastomeric matrix forming material.

18. The method as claimed in claim 17 in which the anchoring agent present in the first size composition comprises a compound selected from the group consisting of an organo silicon compound and a Werner complex compound in which the organic group attached to the silicon atom of the organo silicon compound and the carboxylato group attached to the chromium atom of the Werner complex compound contains a group selected from the group consisting of an amino group and an epoxy group.

19. The method as claimed in claim 17 which includes the additional step of overcoating the impregnated bundle of glass fibers with an assimilation agent for blending the elastomeric material of the impregnant with the elastomeric matrix forming material.

20. The method as claimed in claim 17 which includes the step of coating with the first size composition and impregnating with the elastomeric material in a single first coating step in which the elastomeric material and the anchoring agent are present in the size composition.

21. A glass fiber product produced by the method of claim 1 comprising an endless bundle of glass fibers impregnated with a composition containing an elastomeric material as an essential ingredient and a slip material as an overcoating on the bundle of impregnated glass fibers.

22. A glass fiber product produced by the method of claim 10 comprising an endless bundle of glass fibers impregnated with a composition containing an elastomeric material as an essential ingredient and a coating on the impregnated bundle of glass fibers formed of an assimilation agent for blending the elastomeric materials with which the impregnated bundles of glass fibers are to be combined in the manufacture of glass fiber-elastomeric products, and an overcoating on the coated bundle of impregnated glass fibers comprising a slip material to permit processing the glass fibers without seizure.

23. A glass fiber product produced by the method of claim 17 comprising bundles of glass fibers, a size on the surfaces of the glass fibers in the bundle containing an anchoring agent, and impregnant in the glass fiber bundle wherein the impregnant contains an elastomeric material as an essential ingredient and a coating on the impregnated bundle of glass fibers comprising a lubricating material to prevent seizure of the impregnated bundle of glass fibers during processing.

24. A glass fiber product produced by the method of claim 18 which comprises a bundle of glass fibers with a size coating on the glass fiber surfaces containing an anchoring agent, a material impregnating the bundle of sized glass fibers containing an elastomeric material as an essential ingredient, an assimilation compound coating the impregnated bundle of glass fibers to blend the elastomeric material of the impregnant with the elastomer material with which the bundle of glass fibers are combined in the manufacture of glass fiber-elastomeric products, and an overcoating on the bundle of glass fibers formed of a lubricating material to permit processing of the impregnated bundle of glass fibers to a form desired for combination with the elastomeric material with which the glass fibers are combined in the manufacture of glass fiber-elastomeric products.

References Cited

UNITED STATES PATENTS

| 1,197,396 | 9/1916 | Price | 57—164 |
| 2,134,324 | 10/1938 | Brackett | 57—153 |
| 2,392,805 | 1/1946 | Biefeld | 57—153 |
| 2,413,428 | 12/1946 | Billings | 57—164 |
| 2,485,019 | 10/1949 | Somerville | 57—153 |
| 2,767,519 | 10/1956 | Bjorksten | 65—3 |
| 3,029,590 | 4/1962 | Caroselli et al. | 57—140 |
| 3,070,559 | 12/1962 | Nitzsche et al. | 117—126 |
| 3,252,278 | 5/1966 | Marzocchi et al. | 57—153 |
| 2,763,573 | 9/1956 | Biefeld | 117—72 |
| 2,801,189 | 7/1957 | Collier | 117—72 |
| 2,799,598 | 7/1957 | Biefeld et al. | 117—126 |

EARL M. BERGERT, *Primary Examiner.*

J. P. MELOCHE, D. J. FRITSCH, *Assistant Examiners.*